(12) United States Patent
Suzuki et al.

(10) Patent No.: US 11,379,130 B2
(45) Date of Patent: Jul. 5, 2022

(54) PREDICTING AND PREPARING VOLUME CONFIGURATIONS

(71) Applicant: Hitachi, Ltd., Tokyo (JP)

(72) Inventors: Takanobu Suzuki, Tokyo (JP); Akihiro Hara, Tokyo (JP); Masakuni Agetsuma, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/297,979

(22) Filed: Mar. 11, 2019

(65) Prior Publication Data

US 2020/0073566 A1 Mar. 5, 2020

(30) Foreign Application Priority Data

Aug. 30, 2018 (JP) .............................. JP2018-162201

(51) Int. Cl.
*G06F 3/06* (2006.01)

(52) U.S. Cl.
CPC .......... *G06F 3/0631* (2013.01); *G06F 3/0604* (2013.01); *G06F 3/0644* (2013.01); *G06F 3/0673* (2013.01)

(58) Field of Classification Search
CPC .... G06F 3/0631; G06F 3/0673; G06F 3/0644; G06F 3/0604
See application file for complete search history.

(56) References Cited

U.S. PATENT DOCUMENTS

| | | | | |
|---|---|---|---|---|
| 7,584,340 B1 * | 9/2009 | Colgrove | ............... | G06F 3/0608 360/48 |
| 9,311,019 B2 * | 4/2016 | Winokur | ............... | G06F 3/0665 |
| 9,804,993 B1 * | 10/2017 | Brooker | ............... | G06F 11/008 |
| 9,823,840 B1 * | 11/2017 | Brooker | ............... | G06F 3/0604 |
| 9,965,334 B1 * | 5/2018 | Tan | ............... | G06F 9/5077 |
| 10,324,643 B1 * | 6/2019 | Huang | ............... | G06F 3/061 |
| 10,506,026 B1 * | 12/2019 | Brown | ............... | H04L 67/34 |
| 2006/0271754 A1 | 11/2006 | Shibayama et al. | | |
| 2007/0055737 A1 * | 3/2007 | Yamashita | ............... | G06F 3/0665 709/213 |
| 2007/0130424 A1 * | 6/2007 | Hashimoto | ............... | G06F 3/0608 711/114 |

(Continued)

FOREIGN PATENT DOCUMENTS

| JP | 2006-331158 A | 12/2006 |
|---|---|---|
| JP | 2013515292 A | 5/2013 |

OTHER PUBLICATIONS

Japanese Office Action received in corresponding Japanese Application No. 2018-162201 dated Aug. 25, 2020.

*Primary Examiner* — Arpan P. Savla
*Assistant Examiner* — Richard L Sutton
(74) *Attorney, Agent, or Firm* — Mattingly & Malur, PC

(57) ABSTRACT

A storage system having a processor that provides a volume to be an object of an input/output (I/O) request and executes I/O in response to the I/O request includes a valid volume provided to be the object of the I/O request, and an invalid volume not being provided to be the object. A plurality of invalid volumes includes invalid volumes of a plurality of types of capacities. The processor selects, when a volume creation request is received, the invalid volume on the basis of capacity according to the volume creation request to convert the selected invalid volume into a valid volume, and provides the validated valid volume.

8 Claims, 18 Drawing Sheets

| VOLUME CAPACITY | $N_E$ | $N_R$ | $N_{DIF} (= N_E - N_R)$ |
|---|---|---|---|
| 1TB | 10 | 30 | -20 → DIFFERENCE IS NEGATIVE: DELETE 20 INVALID VOLUMES |
| 2TB | 10 | 30 | -20 → DIFFERENCE IS NEGATIVE: DELETE 20 INVALID VOLUMES |
| 3TB | 20 | 10 | 10 → EXISTENCE UPPER LIMIT IS REACHED; VOLUME OF 3TB IS NOT CREATED |
| 4TB | 100 | 20 | 80 → ADD 80 INVALID VOLUMES OF UPPER LIMIT VALUE (4TB) WITHIN CAPACITY RANGE |
| 5TB | 100 | 20 | 80 → ADD 80 INVALID VOLUMES OF UPPER LIMIT VALUE (5TB) WITHIN CAPACITY RANGE |
| 6TB | 20 | 40 | -20 → DIFFERENCE IS NEGATIVE: DELETE 20 INVALID VOLUMES |
| TOTAL | 260 | 150/250 (THRESHOLD VALUE) | |

(56) References Cited

U.S. PATENT DOCUMENTS

| | | | |
|---|---|---|---|
| 2007/0245116 A1* | 10/2007 | Yamamoto | G06F 3/0608 |
| | | | 711/172 |
| 2009/0157998 A1* | 6/2009 | Batterywala | G06F 3/0605 |
| | | | 711/171 |
| 2009/0249018 A1* | 10/2009 | Nojima | G06F 3/0665 |
| | | | 711/170 |
| 2010/0228933 A1* | 9/2010 | Braginsky | G06F 11/1458 |
| | | | 711/162 |
| 2011/0029970 A1* | 2/2011 | Arasaratnam | G06F 9/45558 |
| | | | 718/1 |
| 2011/0185135 A1* | 7/2011 | Fujii | G06F 3/0689 |
| | | | 711/162 |
| 2012/0023305 A1* | 1/2012 | Satoyama | G06F 3/0604 |
| | | | 711/170 |
| 2012/0030404 A1* | 2/2012 | Yamamoto | G06F 3/0619 |
| | | | 711/6 |
| 2012/0191929 A1* | 7/2012 | Zietzke | G06F 9/5072 |
| | | | 711/162 |
| 2012/0278589 A1 | 11/2012 | Yoshihara | |
| 2017/0242617 A1* | 8/2017 | Walsh | G06F 3/0632 |

\* cited by examiner

FIG. 6

VOLUME CONFIGURATION TABLE
140

| VOLUME ID | NODE ID | NODE IP | INTERNAL CAPACITY | EXTERNAL CAPACITY | STATUS FLAG |
|---|---|---|---|---|---|
| 0xbeefcafe | 0 | xxx.xxx.xxx.xxx | 1TB | 1TB | VALID |
| 0xbeefcaff | 1 | aaa.aaa.aaa.aaa | 1TB | 500GB | VALID |
| 0xbeefcb00 | 2 | bbb.bbb.bbb.bbb | 2TB | 1TB | VALID |
| 0xbeefcb01 | 3 | ccc.ccc.ccc.ccc | 2TB | 2TB | VALID |
| 0xbeefcb02 | 4 | ddd.ddd.ddd.ddd | 2TB | - | INVALID |
| 0xbeefcb03 | 5 | eee.eee.eee.eee | 3TB | - | INVALID |
| ⋮ | ⋮ | ⋮ | | | |

OPERATION REQUEST HISTORY TABLE
130

| 701 | 702 | 703 | 704 | 705 | 706 |
|---|---|---|---|---|---|
| REQUEST SOURCE IP | REQUEST TYPE | VOLUME CAPACITY | NUMBER OF VOLUMES | VOLUME ID | RECEPTION DATE AND TIME |
| xxx.xxx.xxx.xxx | VOLUME CREATION | 1TB | 10 | - | 2018/02/08 16:03:14 |
| yyy.yyy.yyy.yyy | VOLUME CREATION | 2TB | 4 | - | 2018/02/08 17:23:45 |
| zzz.zzz.zzz.zzz | VOLUME DELETION | - | - | 0xBEEFCAFE | 2018/02/08 22:45:37 |
| ... | ... | ... | ... | ... | ... |

FIG. 8

UPPER LIMIT MANAGEMENT TABLE
511

| NODE ID 801 | NODE IP 802 | AMOUNT OF MEMORY 803 | UPPER LIMIT 804 |
|---|---|---|---|
| 0 | xxx.xxx.xxx.xxx | 64GB | 30 |
| 1 | aaa.aaa.aaa.aaa | 128GB | 30 |
| 2 | bbb.bbb.bbb.bbb | 256GB | 100 |
| 3 | ccc.ccc.ccc.ccc | 512GB | 120 |
| 4 | ddd.ddd.ddd.ddd | 128GB | 300 |
| ... | ... | ... | ... |

FIG. 13

| VOLUME CAPACITY | $N_E$ | $N_R$ | $N_{DIF}$ (= $N_E - N_R$) |
|---|---|---|---|
| 1TB | 10 | 30 | -20 → DIFFERENCE IS NEGATIVE; DELETE 20 INVALID VOLUMES |
| 2TB | 10 | 30 | -20 → DIFFERENCE IS NEGATIVE; DELETE 20 INVALID VOLUMES |
| 3TB | 20 | 10 | 10 → EXISTENCE UPPER LIMIT IS REACHED; VOLUME OF 3TB IS NOT CREATED |
| 4TB | 100 | 20 | 80 → ADD 80 INVALID VOLUMES OF UPPER LIMIT VALUE (4TB) WITHIN CAPACITY RANGE |
| 5TB | 100 | 20 | 80 → ADD 80 INVALID VOLUMES OF UPPER LIMIT VALUE (5TB) WITHIN CAPACITY RANGE |
| 6TB | 20 | 40 | -20 → DIFFERENCE IS NEGATIVE; DELETE 20 INVALID VOLUMES |
| TOTAL | 260 | 150/250 (THRESHOLD VALUE) | |

FIG. 15

VOLUME CREATION SCHEDULE TABLE
1500

| DATE AND TIME | VOLUME CAPACITY | NUMBER OF VOLUMES |
|---|---|---|
| 2018/02/23 18:00 | 6TB | 10 |
| 2018/02/23 18:00 | 2TB | 40 |
| 2018/03/01 09:00 | 1TB | 80 |
| ... | ... | ... |

POOL OPERATION HISTORY TABLE
1700

| REQUEST SOURCE IP | REQUEST TYPE | POOL ID | VOLUME ID | VOLUME CAPACITY | RECEPTION DATE AND TIME |
|---|---|---|---|---|---|
| xxx.xxx.xxx.xxx | POOL EXPANSION | 0 | 0xcafebeef | 10TB | 2018/02/08 16:03:14 |
| xxx.xxx.xxx.xxx | POOL EXPANSION | 0 | 0xcafebef0 | 10TB | 2018/02/08 16:03:14 |
| xxx.xxx.xxx.xxx | POOL EXPANSION | 0 | 0xcafebef1 | 10TB | 2018/02/08 16:03:14 |
| yyy.yyy.yyy.yyy | POOL EXPANSION | 1 | 0xcafebef2 | 10TB | 2018/02/08 22:45:37 |
| yyy.yyy.yyy.yyy | POOL EXPANSION | 1 | 0xcafebef3 | 10TB | 2018/02/08 22:45:37 |
| ... | ... | ... | ... | ... | ... |

1701 / 1702 / 1703 / 1704 / 1705 / 1706

PREDICTING AND PREPARING VOLUME CONFIGURATIONS

BACKGROUND OF THE INVENTION

1. Field of the Invention

The present invention generally relates to storage control.

2. Description of the Related Art

A technique related to a storage system disclosed in, for example, JP 2013-515292 A has been known. In the disclosure of JP 2013-515292 A, there is provided a storage system that allows each microprocessor to execute synchronous processing and asynchronous processing according to an operation status of the storage system. Any one of attributes among a plurality of attributes (operation modes) prepared in advance is set in each microprocessor according to the operation status of the storage system. The attribute set in each microprocessor is periodically reviewed and changed.

SUMMARY OF THE INVENTION

Hereinafter, a configuration according to the number of volumes and volume capacity (storage capacity of volume) will be referred to as a "volume configuration". In addition, processing of performing input/output (I/O) in response to an I/O command to return a response is referred to as "synchronous processing", and predetermined processing other than the synchronous processing is referred to as "asynchronous processing".

In general, an administrator sets a volume configuration in a storage system before launching a service, and after the service is launched, the volume configuration is infrequently changed. Therefore, in the storage system, a priority level of the asynchronous processing (e.g., processing of volume configuration change) is normally lower than the priority level of the synchronous processing.

In recent years, a virtual environment such as a virtual machine (VM) and a container and a software defined storage (SDS) have emerged so that the frequency of volume configuration changes after launching the service is increasing. For example, in what is called an automatic test using a VM, volumes are created and discarded periodically (e.g., at intervals of several hours).

Processing such as volume creation and a volume capacity change may be executed during the period from the start to completion of the volume configuration change at times, which may take time. When the frequency of the volume configuration change increases, the volume configuration change is preferably performed quickly (especially in the virtual environment described above).

However, in the storage system, as described above, the priority level of the synchronous processing is relatively high (e.g., the highest) in general, whereby the volume configuration change is difficult to perform quickly. The priority level of the volume configuration change may be set to be higher than the priority level of the synchronous processing as a method of quickly performing the volume configuration change. However, in such a case, performance of the synchronous processing (i.e., I/O performance) may be lowered.

A storage system having a processor that provides a volume to be an object of an input/output (I/O) request and executes I/O in response to the I/O request includes a valid volume provided to be the object of the I/O request, and an invalid volume not being provided to be the object. A plurality of invalid volumes includes invalid volumes of a plurality of types of capacities. The processor selects, when a volume creation request is received, the invalid volume on the basis of capacity according to the volume creation request to convert the selected invalid volume into a valid volume, and provides the validated valid volume.

According to the present invention, it can be expected to improve processing performance of a volume configuration change while a decrease in I/O processing performance is suppressed.

BRIEF DESCRIPTION OF THE DRAWINGS

FIG. 6 is a diagram illustrating a configuration of a volume configuration table;

FIG. 7 is a diagram illustrating a configuration of an operation request history table;

FIG. 8 is a diagram illustrating a configuration of an upper limit management table;

FIG. 13 is an explanatory diagram of a specific example of the prediction preparation process;

FIG. 15 is a diagram illustrating a configuration of a volume creation schedule table according to a second embodiment;

FIG. 17 is a diagram illustrating a configuration of a pool operation history table according to a third embodiment;

DESCRIPTION OF THE PREFERRED EMBODIMENTS

Figure 1:
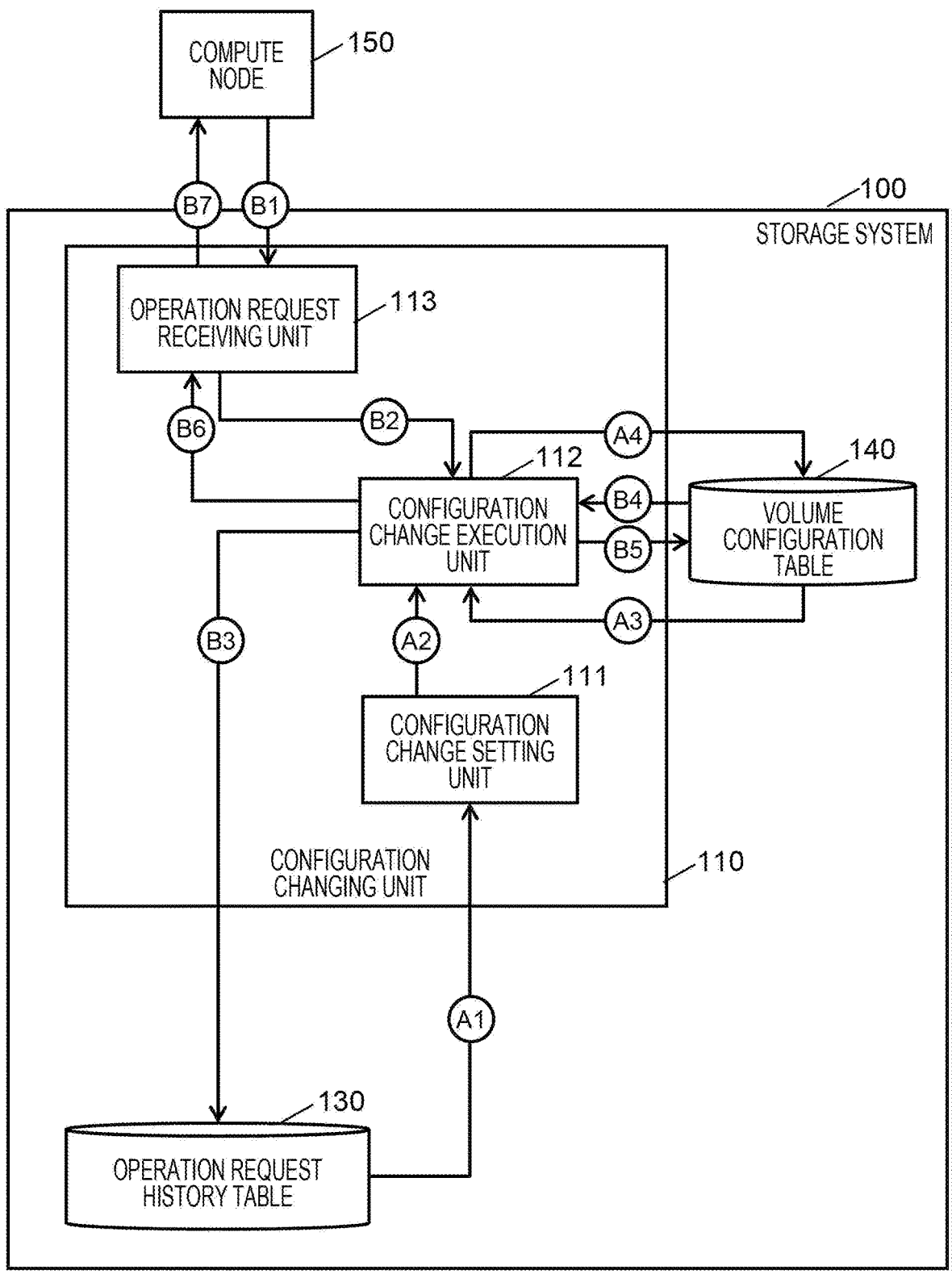
FIG. 1 is a schematic diagram illustrating an outline of a first embodiment.

In the following descriptions, an "interface unit" may be one or more interfaces. The one or more interfaces may be one or more communication interface devices of the same type (e.g., one or more network interface cards (NICs)), or may be two or more communication interface devices of different types (e.g., an NIC and a host bus adapter (HBA)).

In the following descriptions, a "memory unit" is one or more memories, which may typically be a main storage device.

In the following descriptions, a "PDEV unit" is one or more PDEVs, which may typically be an auxiliary storage device. The "PDEV" is an exemplary storage device particularly representing a physical storage device, which may typically be a nonvolatile storage device.

In the following descriptions, a "storage unit" is at least one of the memory unit and at least a part of the PDEV unit (which is typically at least the memory unit).

In the following descriptions, a "processor unit" is at least one processor. The at least one processor is typically a microprocessor such as a central processing unit (CPU), but it may be another kind of processor such as a graphics processing unit (GPU). The at least one processor may be a single core processor or a multi-core processor. The at least one processor may be a processor in a broad sense, such as a hardware circuit (e.g., field-programmable gate array (FPGA)) and an application specific integrated circuit (ASIC), that performs a part of or all of the processing.

In the following descriptions, information by which an output can be obtained to an input may be described with an expression such as a "xxx table" in some cases. This kind of information may be data having any structure, and may be a learning model that generates an output to an input, such as a neural network. Accordingly, the "xxx table" can be called "xxx information". In the following descriptions, a configuration of each table is an example, and one table may be divided into two or more tables, or all of or a part of two or more tables may be one table.

In the following descriptions, a term "kkk unit" (excluding interface unit, storage unit, and processor unit) may describe a function, and a function may be implemented by one or more computer programs being executed by the processor unit, or may be implemented by one or more hardware circuits (e.g., FPGA or ASIC). In a case where a function is implemented by a program being executed by the processor unit, predetermined processing is performed using the storage unit, and/or the interface unit, or the like, whereby the function may be made at least a part of the processor unit. Processing described with a function as a subject may be processing performed by the processor unit or an apparatus including the processor unit. The program may be installed from a program source. The program source may be, for example, a program distribution computer or a computer-readable recording medium (e.g., non-transitory recording medium). The description of each function is an example, and a plurality of functions may be combined into one function, or one function may be divided into a plurality of functions.

In the following descriptions, a "storage system" may be a system including one or more physical computers. The physical computer may be a general-purpose computer, or may be a dedicated computer. One or more virtual computers (e.g., virtual machine (VM)) may be executed in at least one physical computer. The virtual computer may be a computer that issues an I/O command, or may be a computer that performs I/O of data in response to an I/O command. A software-defined anything (SDx) may be constructed in the physical computer or a system including the physical computer by the physical computer executing predetermined software. Examples of the SDx include a software-defined storage (SDS), and a software-defined datacenter (SDDC). For example, a general-purpose computer may execute software having a storage function to construct a storage system as an SDS. Furthermore, at least one physical computer (e.g., storage device) may include one or more virtual computers as a host system, and a virtual computer as a storage control system (typically, controller for inputting/outputting data to/from the PDEV unit in response to the I/O command) of the storage system. In other words, the at least one physical computer may have both of the function as at least a part of the host system and the function as at least a part of the storage control system.

In the following descriptions, "volume" is an abbreviation of logical volume, and may be a logical storage device (e.g., address space). The volume may be substantive volume based on a physical storage resource (e.g., one or more PDEVs) included in the storage system, or may be virtual volume according to virtualization technology (e.g., thin provisioning).

First Embodiment

FIG. 1 is a schematic diagram illustrating an outline of a first embodiment.

A storage system 100 performs synchronous processing, and asynchronous processing that is processing other than the synchronous processing. In the synchronous processing, when an input/output (I/O) command is received from a compute node 150 (exemplary host system), I/O is performed on the basis of the I/O command to return a response. The storage system 100 includes a configuration changing unit 110, a volume configuration table 140, and an operation request history table 130. The volume configuration table 140 shows a volume configuration (in the present embodiment, relationship between volume capacity and the number of volumes). For example, the volume configuration table 140 holds information indicating a status flag (flag indicating whether it is valid or invalid) and capacity for each volume. The operation request history table 130 shows a history of operation requests for a volume configuration change. The operation request history table 130 is at least a part of an example of a history regarding the volume configuration change in which at least one of the volume capacity and the number of volumes is changed for the storage system 100, an example of which is a creation change.

The configuration changing unit 110 includes a configuration change setting unit 111, a configuration change execution unit 112, and an operation request receiving unit 113. When there is no invalid volume of necessary volume capacity (e.g., volume capacity specified in a volume creation request) when needed (e.g., when the volume creation request is received), the configuration change execution unit 112 performs the creation change (creation of a new invalid volume of the necessary volume capacity, or change in volume capacity of an invalid volume having volume capacity different from the necessary volume capacity) to validate the volume thereafter. On the other hand, when there is an invalid volume of the necessary volume capacity when needed, the configuration change execution unit 112 validates the invalid volume. The creation change mentioned above is unnecessary for that volume. Note that the "invalid volume" is a volume in a state in which I/O cannot be performed as it exists but is not provided (e.g., volume not provided to the compute node 150), for example. Further, "validation of a volume" indicates changing an invalid volume into a valid volume. The "valid volume" is a volume in a state in which I/O can be performed as it has been provided (e.g., volume provided to the compute node 150).

Examples of the processing performed in the present embodiment include prediction of the volume configuration change (example of setting), preparation associated with the prediction, reception of an operation request for the configuration change, and the volume configuration change based on the operation request.

<A. Prediction of Volume Configuration Change and Preparation Processing for Prediction>

The configuration change setting unit 111 refers to the operation request history table 130 (A1), and predicts a set of volume capacity and the number of volumes that will be newly required in the future. The predicted set is input to the configuration change execution unit 112 (A2).

The configuration change execution unit 112 refers to the volume configuration table 140 (A3), and compares, for each predicted volume capacity, $N_E$ (predicted number of volumes) with $N_R$ (number of existing invalid volumes with respect to the volume capacity same as the predicted volume capacity). The configuration change execution unit 112 performs preparation processing in which, in a case where there is volume capacity having $N_R$ smaller than $N_E$ (e.g., in a case where there is volume capacity having no existing invalid volume), a volume of the volume capacity is prepared in advance, which processing is specifically a volume configuration change in which a volume of the volume capacity is created. The number of volumes created for the volume capacity is, for example, equal to or more than $N_{DIF}$ (=$N_E$−$N_R$). The configuration change execution unit 112 updates the volume configuration table 140 according to the preparation processing (A4).

According to the processing illustrated in FIG. 1, possibility of existence of an invalid volume of the necessary volume capacity when needed increases. As a result, it is only necessary to validate the volume in the volume configuration change as an asynchronous processing, whereby the creation change mentioned above is unnecessary. Therefore, it can be expected to improve the processing performance of the volume configuration change while a decrease in synchronous processing performance is suppressed.

<B. Reception of Configuration Change Operation Request and Volume Configuration Change Based on Operation Request>

The operation request receiving unit 113 receives a request for a configuration change operation (operation for changing volume configuration) from the compute node 150 (or from a management computer (not illustrated) in the storage system 100) (B1). The operation request receiving unit 113 notifies the configuration change execution unit 112 of the contents of the received operation request (B2).

The configuration change execution unit 112 records the contents of the operation request in the operation request history table 130 (B3). In other words, the contents of the operation request are added to the history of the volume configuration change.

When the received operation request is a request for volume creation, the operation request includes volume capacity and the number of volumes that are specified. The configuration change execution unit 112 refers to the volume configuration table 140 (B4), and determines whether a volume needs to be created. Here, in order to simplify the descriptions, the specified number of volumes is assumed to be "1". When there is no invalid volume of the volume capacity same as or different from the specified volume capacity, a result of the determination is true (volume creation is necessary). On the other hand, when there is an invalid volume of the volume capacity same as or different from the specified volume capacity, a result of the determination is false (volume creation is unnecessary).

When the result of the determination is true, the configuration change execution unit 112 creates a volume, validates the created volume (records information associated with the volume in the volume configuration table 140) (B5), and then returns a response (B6).

When the result of the determination is false, there are the following two options. When the capacity of an existing invalid volume is the same as the specified volume capacity, the configuration change execution unit 112 validates the volume (changes the status flag for the volume in the volume configuration table 140 from invalid to valid) (B5) to return a response (B6). Meanwhile, even when the capacity of the existing invalid volume is different from the specified volume capacity, the configuration change execution unit 112 validates the volume (B5) to return the response (B6), and then changes the capacity of the volume. Therefore, when the result of the determination is false, in both cases where the capacity of the existing invalid volume is the same as the specified volume capacity and different from the specified volume capacity, the time required for returning the response is short.

The operation request receiving unit 113 receives a response from the configuration change execution unit 112, and returns, on the basis of the response, a response to the received configuration change operation request to the compute node 150 (B7).

Hereinafter, the present embodiment will be described in detail.

Figure 2:
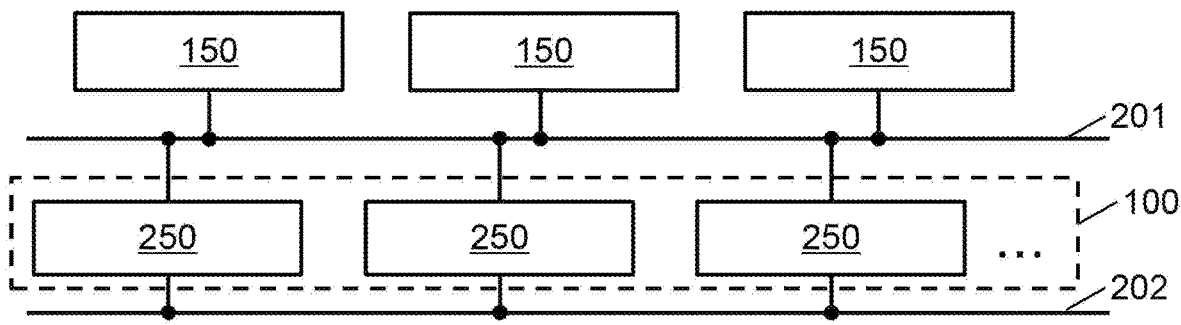
FIG. 2 is a diagram illustrating a configuration of an entire system including a storage system.

FIG. 2 is a diagram illustrating a configuration of the entire system including the storage system 100.

The storage system 100 is a scale-out type system, which includes one or more storage nodes 250. Each storage node 250 is connected to a front-end network 201, and receives, from each of the one or more compute nodes 150, an operation request for a volume configuration change and an I/O command via the network 201. Each storage node 250 is connected to a back-end network 202, and communication between the storage nodes 250 is performed via the network 202. Each of the networks 201 and 202 may be any type of network such as a wide area network (WAN) and a local area network (LAN). The networks 201 and 202 may be integrated.

Figure 3:
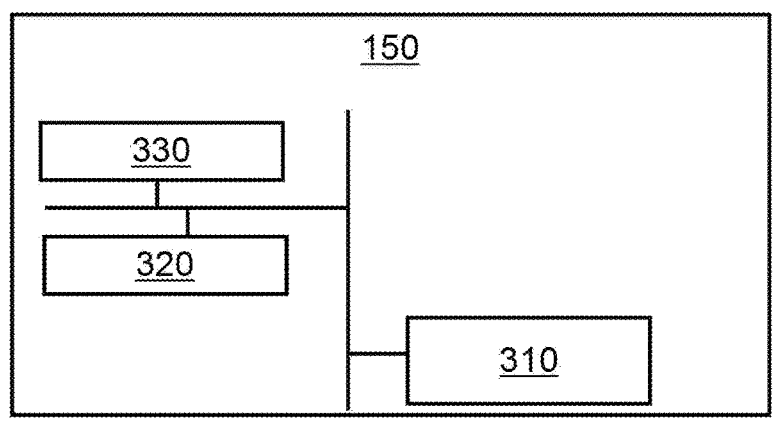
FIG. 3 is a diagram illustrating a hardware configuration of a compute node.

FIG. 3 is a diagram illustrating a hardware configuration of the compute node 150.

The compute node 150 includes an interface unit 310, a storage unit 320, and a processor unit 330 connected to those units. The interface unit 310 is connected to the front-end network 201. The storage unit 320 stores one or more programs. The processor unit 330 executes the one or more programs (in response to operation made by a user as necessary) to issue, to the storage system 100, an I/O command specifying the volume provided from the storage system 100 and an operation request for changing the volume configuration of the storage system 100.

Figure 4:
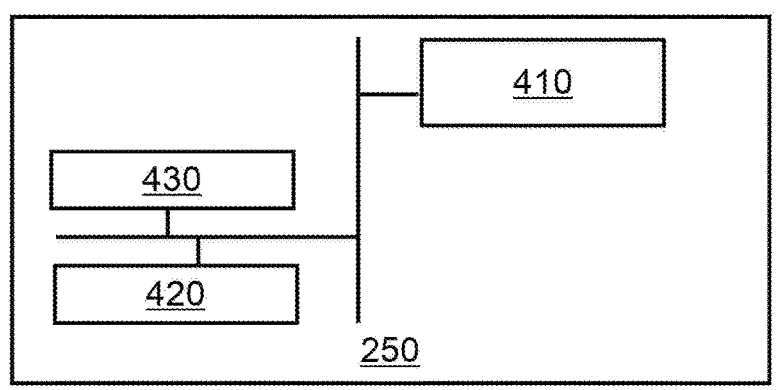
FIG. 4 is a diagram illustrating a hardware configuration of a storage node.

FIG. 4 is a diagram illustrating a hardware configuration of the storage node 250.

The storage node 250 includes an interface unit 410, a storage unit 420, and a processor unit 430 connected to those units. The interface unit 410 is connected to the front-end network 201 and the back-end network 202. The storage unit 420 stores one or more programs and management information. The processor unit 430 executes the one or more programs to implement the function of the configuration changing unit 110 described above. The management information is information including information associated with the storage system 100, which specifically includes the operation request history table 130 and the volume configuration table 140 described above, for example.

Figure 5:
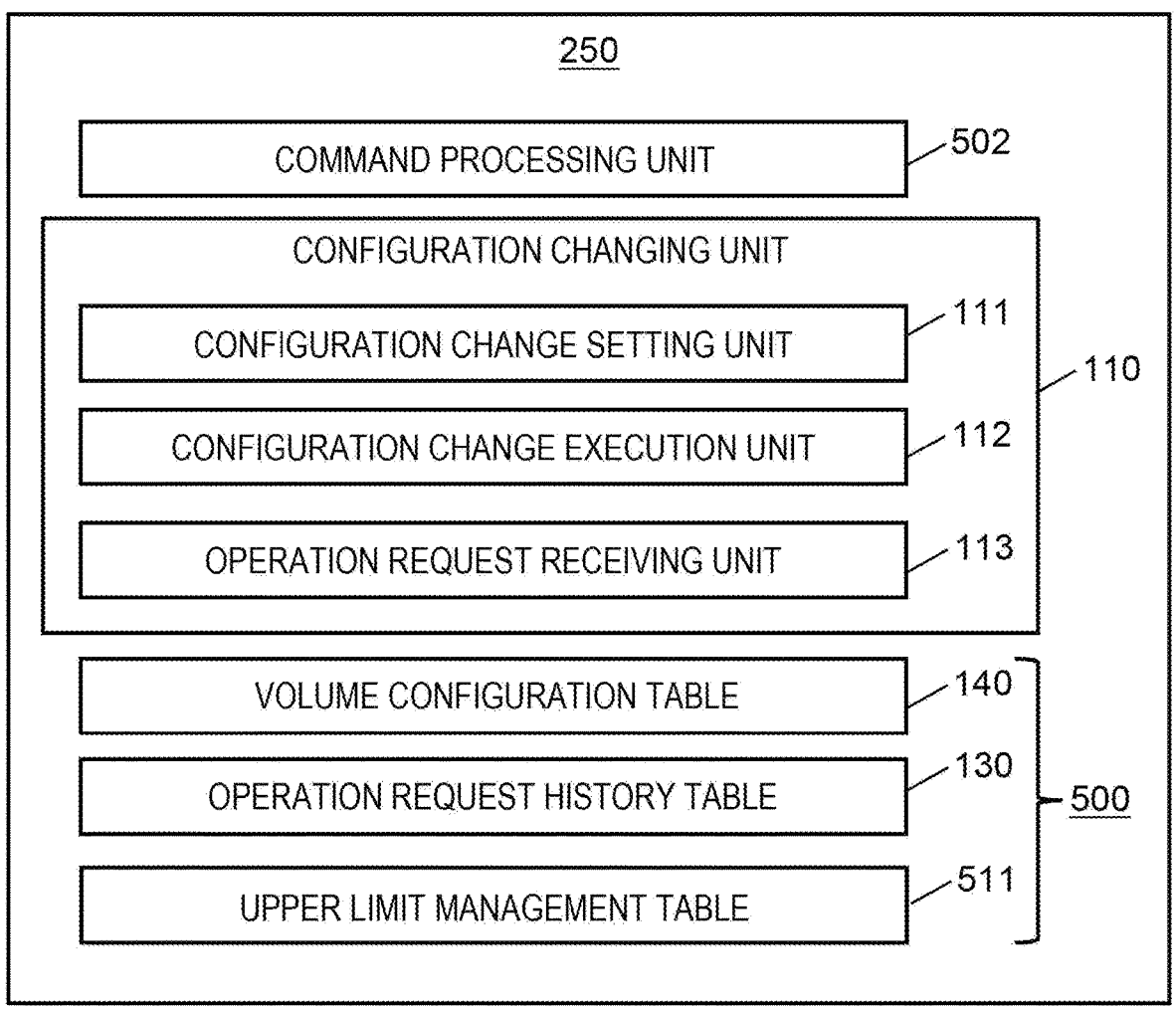
FIG. 5 is a diagram illustrating functions and tables included in the storage node.

FIG. 5 is a diagram illustrating functions and tables included in the storage node 250.

The processor unit 430 executes the one or more programs to implement, in the storage node 250, the functions of a command processing unit 502 and the configuration changing unit 110. The configuration changing unit 110 includes the configuration change setting unit 111, the configuration change execution unit 112, and the operation request receiving unit 113. Those functions will be described later.

In addition, the storage node 250 includes, as tables included in management information 500, the volume configuration table 140, the operation request history table 130, and an upper limit management table 511. Those tables 140, 130, and 511 will be described with reference to FIGS. 6 to 8. Any table in the management information may have the same contents between the storage nodes 250 (e.g., in a case where the table 140 as an example of any table of any storage node 250 is updated, the update may be reflected in the table 140 of each of any other storage node 250 via the back-end network 202). Alternatively, the master storage node 250 may hold the management information of all the storage nodes 250.

FIG. 6 is a diagram illustrating a configuration of the volume configuration table 140.

The volume configuration table 140 holds information associated with the volume configuration. For example, the volume configuration table 140 has an entry for each volume. Each entry stores information such as volume ID 601, node ID 602, a node IP 603, internal capacity 604, external capacity 605, and a status flag 606. Hereinafter, one volume ("target volume" in the descriptions of FIG. 6) will be exemplified.

The volume ID 601 indicates identification data (ID) of the target volume. The node ID 602 indicates ID of the storage node 250 having the target volume. The node IP 603 indicates an IP address (exemplary address on the network 201) of the storage node 250 having the target volume. The internal capacity 604 indicates internal capacity that is actual capacity of the target volume (capacity internally managed by the storage node 250). The external capacity 605 indicates external capacity that is, among the internal capacity of the target volume, actually provided capacity (e.g., capacity shown by the compute node 150). The status flag 606 indicates whether the target volume is valid or invalid.

As illustrated in FIG. 6, the volume corresponding to the status flag 606 "invalid" has the external capacity 605 being blank ("-"). This is because the capacity is not provided.

FIG. 7 is a diagram illustrating a configuration of the operation request history table 130.

The operation request history table 130 shows a history of volume configuration change. The "volume configuration change" is to change at least one of the volume capacity and the number of volumes, one example of which is the creation change described above. For example, the operation request history table 130 has an entry for each operation request. Each entry stores information such as a request source IP 701, a request type 702, volume capacity 703, the number of volumes 704, volume ID 705, and a reception date and time 706. Hereinafter, one operation request ("target operation request" in the descriptions of FIG. 7) will be exemplified.

The request source IP 701 indicates an IP address (node IP) of the compute node 150 as a transmission source of the target operation request. The request type 702 indicates a type of the volume change operation (e.g., "volume creation" and "volume deletion") specified by the target operation request. The volume capacity 703 indicates the volume capacity specified by the target operation request. The number of volumes 704 indicates the number of volumes specified by the target operation request. The volume ID 705 indicates the volume ID specified by the target operation request. The reception date and time 706 indicates the date and time at which the target operation request has been received.

FIG. 8 is a diagram illustrating a configuration of the upper limit management table 511.

The upper limit management table 511 indicates the upper limit of existence, which is the upper limit of the number of volumes that can exist for each storage node 250. With the upper limit of existence being set, a size of the management information 500 including a table such as the volume configuration table 140 (e.g., amount of memory consumption) can be limited. For example, the upper limit management table 511 has an entry for each storage node 250. Each entry stores information such as node ID 801, a node IP 802, a memory amount 803, and an upper limit 804. Hereinafter, one storage node 250 ("target storage node 250" in the descriptions of FIG. 8) will be exemplified.

The node ID 801 indicates ID of the target storage node 250. The node IP 802 indicates an IP address of the target storage node 250. The memory amount 803 indicates an amount of memory that the target storage node 250 has (capacity of a memory in the storage unit 420). The upper limit 804 indicates the upper limit of existence, which is the upper limit of the number of volumes that can exist in the target storage node 250. The upper limit of existence may be automatically determined on the basis of the memory amount 803 for the target storage node 250.

Hereinafter, an exemplary process performed in the present embodiment will be described.

Figure 9:
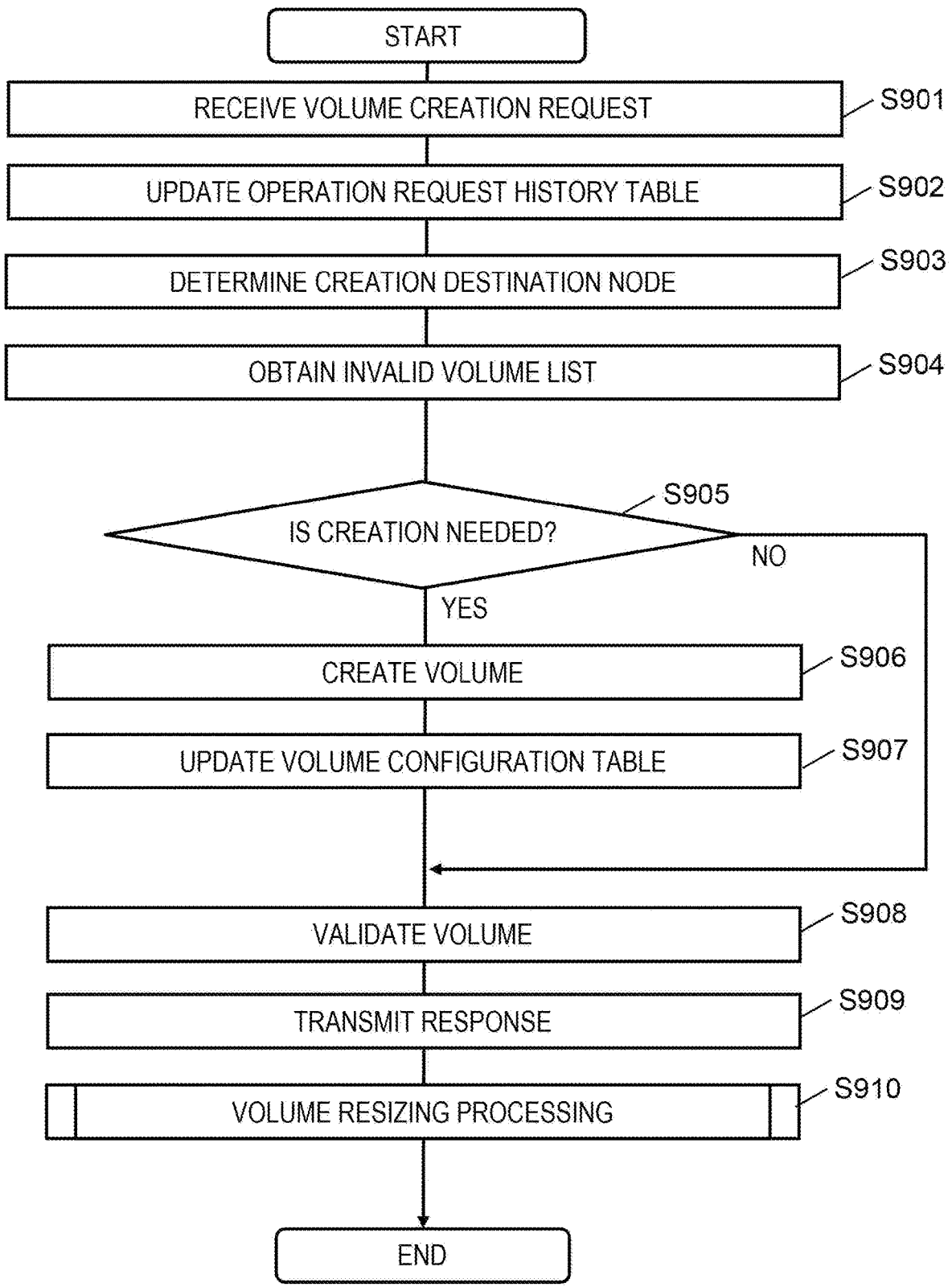
FIG. 9 is a flowchart of a volume creation request process as an example of an operation request for a volume configuration change.

FIG. 9 is a flowchart of a volume creation request process as an example of an operation request for a volume configuration change.

The operation request receiving unit 113 receives a volume creation request (S901). The configuration change execution unit 112 records the contents of the volume creation request in the operation request history table 130 (S902).

The configuration change execution unit 112 determines the storage node 250 as a destination of creation of the volume according to the volume creation request (S903). This determination may be made in accordance with a predetermined policy (e.g., random or round robin).

The configuration change execution unit 112 obtains, on the basis of the volume configuration table 140, a list of invalid volumes (e.g., list of sets of internal capacity and the number of volumes) for the storage node 250 determined in S903 (hereinafter, determined node 250 in the descriptions of FIG. 9) (S904).

The configuration change execution unit 112 determines, on the basis of the list obtained in S904, whether a volume according to the volume creation request needs to be created in the determined node 250 (S905). Here, when there is no information regarding invalid volumes in the list, that is, when there is no invalid volume in the determined node 250, a result of the determination in S905 is true (S905: YES). On the other hand, when there is even one invalid volume in the determined node 250, a result of the determination in S905 is false (S905: NO). Hereinafter, in order to simplify the descriptions of FIG. 9, when the number of volumes specified by the volume creation request is "2" or more and the invalid volumes are insufficient in the determined node 250, "S905: YES" is applied at least a part of the specified number of volumes. In other words, when the specified number of volumes is "2" or more, "S905: YES" or "S905: NO", or both of them may be applied for the specified number of volumes in some cases.

When the determination result in S905 is true (S905: YES), the configuration change execution unit 112 creates a volume having the internal capacity same as the specified volume capacity in the determined node 250 (S906), and adds an entry related to the created volume to the volume configuration table 140 (S907).

On the other hand, when the determination result in S906 is false (S905: NO), S906 and S907 are skipped.

The configuration change execution unit 112 validates the invalid volume determined with respect to the specified volume capacity, specifically, changes the status flag 606 corresponding to the volume from "invalid" to "valid" (S908). Hereinafter, in order to simplify the descriptions of FIGS. 9 and 10, the determined validated volume will be referred to as a "target volume" in the descriptions pf FIGS. 9 and 10.

The operation request receiving unit 113 returns a response to the volume creation request (S909). This response is a response of creation completion indicating that the creation change in which an invalid volume of the necessary volume capacity is newly created or the volume capacity of the invalid volume having the volume capacity different from the necessary volume capacity is changed is performed and then the volume is validated.

According to the process described above, regardless of whether the invalid volume having the internal capacity same as the specified volume capacity exists, as long as there is an invalid volume, the compute node 150 as a transmission source of the volume creation request can receive a response in a short time after the volume creation request is transmitted. This is because S906 and S907 are skipped. It is highly likely that the invalid volume is prepared in advance in a prediction preparation process to be described later on the basis of the operation request history table 130. As a result, it is highly likely that processing according to the volume creation request becomes faster.

After S909, the configuration change execution unit 112 performs volume resizing processing (FIG. 9) on the target volume (S910).

In the case of "S905: YES", the external capacity 605 of the created volume is the same as the internal capacity 604, and the internal capacity 604 shows the capacity same as the specified volume capacity.

In the case of "S905: NO", when there is an invalid volume corresponding to the internal capacity 604 that matches the specified volume capacity, such an invalid volume is validated in S908, and the external capacity 605 of this volume is made to be a value same as the internal capacity 604. On the other hand, when there is no invalid volume corresponding to the internal capacity 604 that matches the specified volume capacity, any invalid volume (e.g., invalid volume corresponding to the internal capacity 604 closest to the specified volume capacity) is validated in S908, and the external capacity 605 of this volume is made to be a value same as the specified volume capacity (accordingly, the external capacity 605 is different from the internal capacity 604 for this volume). The operation request receiving unit 113 and the configuration change execution unit 112 to be executed in the processing of the volume creation request may exist in the same storage node 250, or may exist in different storage nodes 250.

Figure 10:
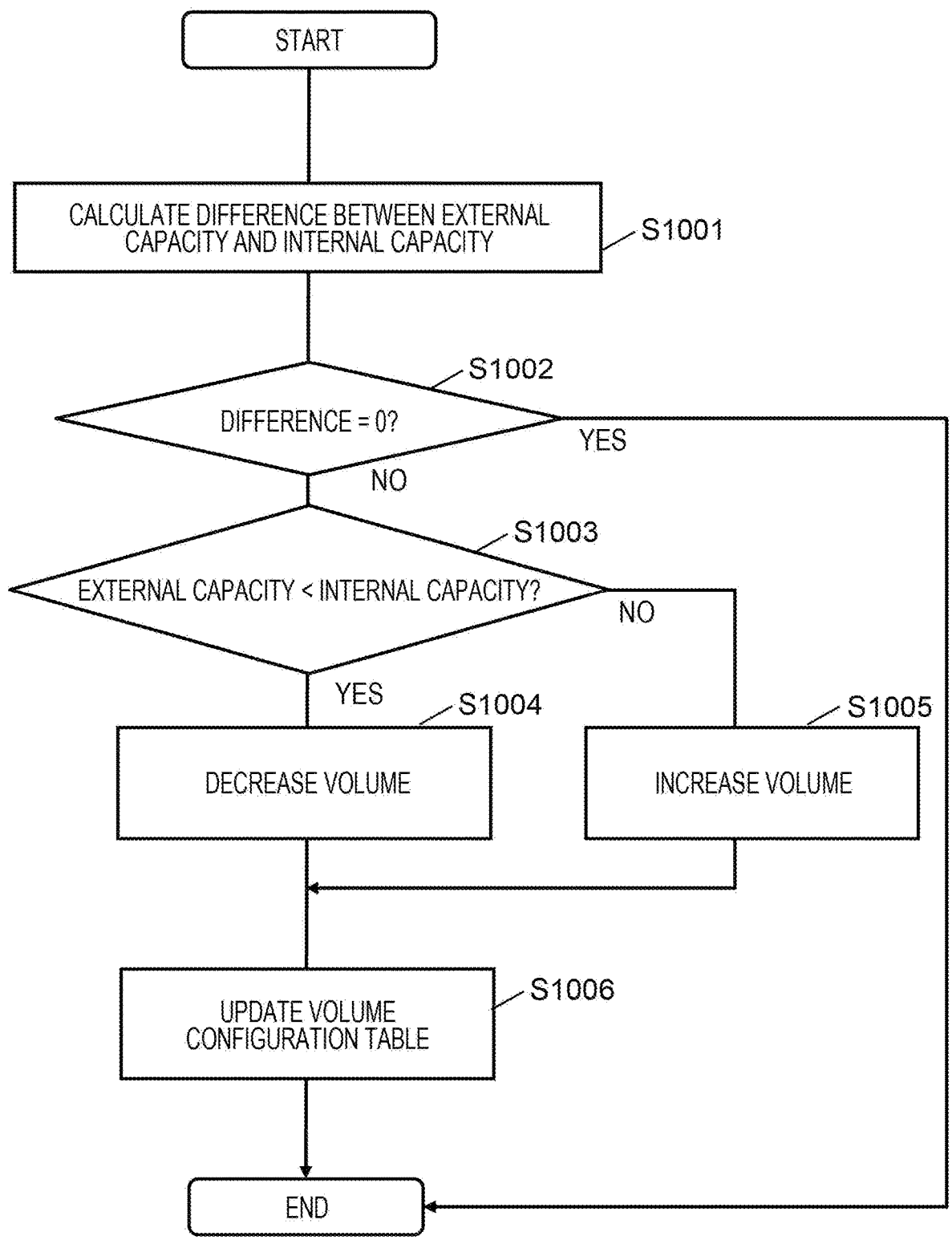
FIG. 10 is a flowchart of a volume resizing process.

FIG. 10 is a flowchart of a volume resizing process.

For the target volume, the configuration change execution unit 112 refers to the volume configuration table 140, and calculates a difference between the external capacity 605 and the internal capacity 604 (S1001). The configuration change execution unit 112 determines whether the calculated difference is zero (S1002). When a result of the determination in S1002 is true (S1002: YES), the process is terminated.

When the result of the determination in S1002 is false (S1002: NO), the configuration change execution unit 112 determines whether the internal capacity 604 is larger than the external capacity 605 (S1003). When a result of the determination in S1003 is true (S1003: YES), the configuration change execution unit 112 decreases the volume (i.e., decreases the internal capacity of the target volume to such an extent that it coincides with the external capacity) (S1004). When the result of the determination in S1003 is false (S1003: NO), the configuration change execution unit 112 increases the volume (i.e., increases the internal capacity of the target volume to such an extent that it coincides with the external capacity) (S1005). After S1004 and S1005, the configuration change execution unit 112 updates the internal capacity 604 to be a value indicating the updated internal capacity (S1006).

Figure 11:
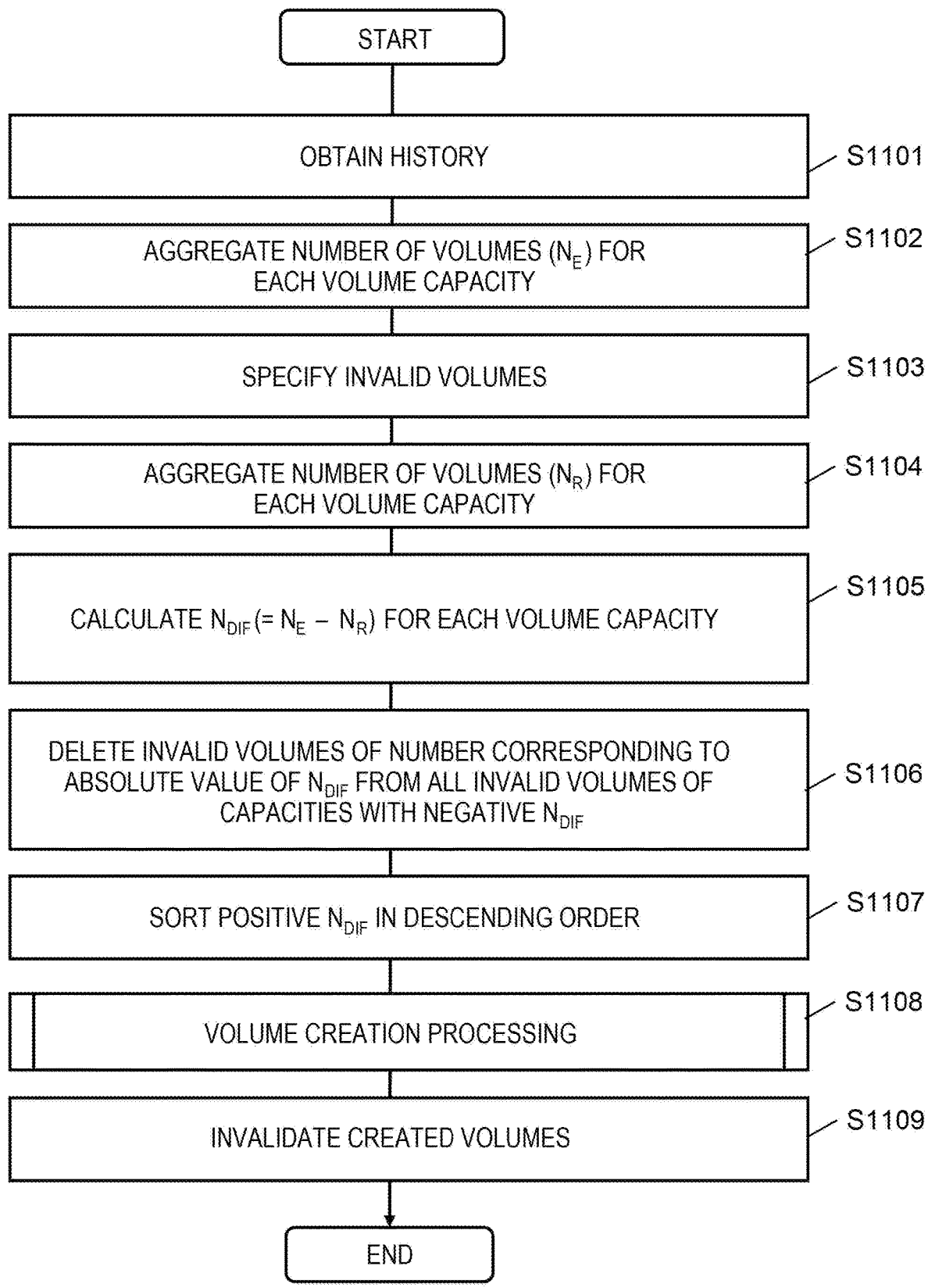
FIG. 11 is a flowchart of a prediction preparation process.

FIG. 11 is a flowchart of a prediction preparation process. The prediction preparation process starts periodically or irregularly. In FIGS. 11, S1101 and S1102 belong to a prediction process of the prediction preparation process, and S1103 to S1109 belong to a preparation process of the prediction preparation process.

The configuration change setting unit 111 obtains, from the operation request history table 130, a portion of the history (all entries) to which the reception date and time 706 belongs during a certain period (e.g., period from the previous prediction preparation process in FIG. 11 to the current prediction preparation process in FIG. 11) (S1101). The configuration change setting unit 111 aggregates, for each volume capacity indicated by the obtained portion of the history, the number of volumes ($N_E$) on the basis of the obtained portion of the history (S1102). A set of the volume capacity and the number of volumes aggregated for the volume capacity for each volume capacity is an example of a set of the predicted volume capacity and the predicted number of volumes. Note that the prediction of the set of the volume capacity and the number of volumes may be based on the output obtained by the portion of the history being set as an input of a predetermined learning model.

The configuration change execution unit 112 specifies invalid volumes from the volume configuration table 140 (S1103), and aggregates the number of invalid volumes ($N_R$) specified in S1103 for each volume capacity (specifically, for the internal capacity same as each volume capacity in S1102, etc.) (S1104).

The configuration change execution unit 112 calculates $N_{DIF}=N_E-N_R$ for each volume capacity (S1105). $N_E$ is the number of volumes calculated in S1102. $N_R$ is the number of volumes calculated in S1104.

When there is volume capacity in which $N_{DIF}$ is negative, the configuration change execution unit 112 deletes a number of invalid volumes, the number of which corresponds to the absolute value of $N_{DIF}$ at the maximum, among all invalid volumes of the volume capacity (S1106). Accordingly, for the storage node 250 having the deleted volume, a further difference is generated between the existence upper limit corresponding to the storage node 250 (value indicated by the upper limit 804) and the number of existing volumes. In other words, the number of volumes that can be newly created increases.

The configuration change execution unit 112 sorts the positive $N_{DIF}$ in descending order (S1107). The configuration change execution unit 112 performs a volume creation process (FIG. 12) (S1108). The configuration change execution unit 112 invalidates each volume created in S1107 (changes the status flag 606 of each volume to "invalid") (S1109).

Figure 12:
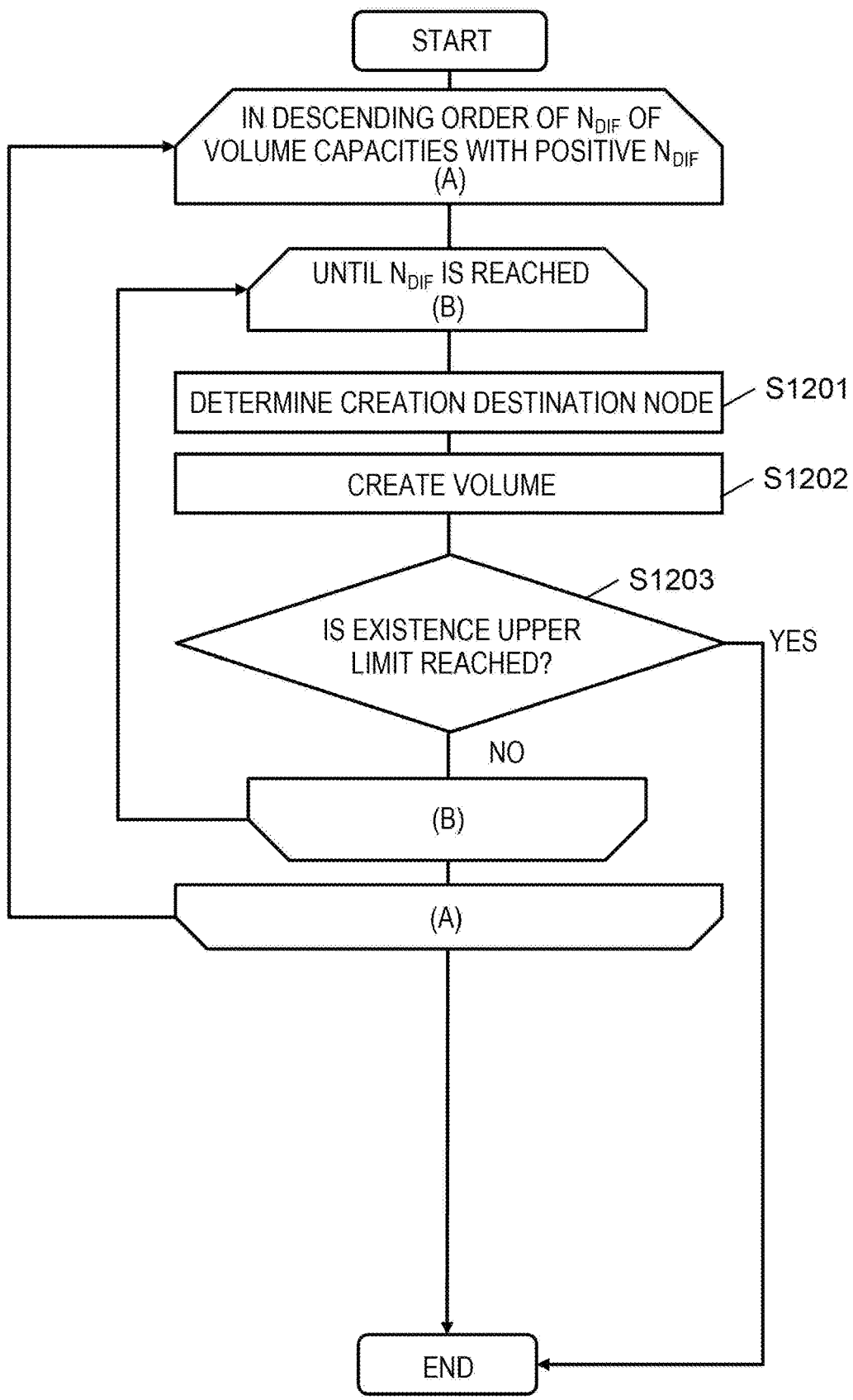
FIG. 12 is a flowchart of a volume creation process in the prediction preparation process.

FIG. 12 is a flowchart of the volume creation process in the prediction preparation process.

The configuration change execution unit 112 performs a loop B in descending order of $N_{DIF}$ for all volume capacities with the positive $N_{DIF}$ (loop A). Among the volume capacities with the positive $N_{DIF}$, the larger $N_{DIF}$ is in the volume capacity, the lower the possibility of existence of the volume is when it is specified by the volume creation request. Meanwhile, according to FIG. 12, the volume capacity with higher $N_{DIF}$ is more preferentially set as a target of volume creation. Therefore, in the processing of the volume creation request, the possibility of existence of the volume having the internal capacity same as the specified volume capacity can be made higher. Hereinafter, one volume capacity ("target capacity" in the descriptions of FIG. 12) will be exemplified.

With respect to the target capacity, in the loop B, the following S1201 to S1203 are repeated until the number of created volumes (volumes having the internal capacity same as the target capacity) reaches $N_{DIF}$.

That is, the configuration change execution unit 112 determines the storage node 250 as the destination of creation of the volume (S1201). In S1201, for example, the configuration change execution unit 112 refers to the volume configuration table 140 and the upper limit management table 511, and determines, as a creation destination, the storage node 250 having the largest difference between the upper limit of existence and the number of existing volumes.

The configuration change execution unit 112 creates a volume having the internal capacity same as the target capacity in the storage node 250 determined in S1201, and adds an entry related to the volume to the volume configuration table 140 (S1202).

The configuration change execution unit 112 refers to the volume configuration table 140 and the upper limit management table 511, and determines whether the number of volumes existing in all the storage nodes 250 has reached the sum of the existence upper limits of all the storage nodes 250 (S1203).

When a result of the determination in S1203 is false (S1203: NO), the number of created volumes is incremented for the target capacity, and if the number of volumes after being incremented has not reached $N_{DIF}$, the process returns to S1201.

On the other hand, when the result of the determination in S1203 is true (S1203: YES), the volume creation process is terminated.

A specific example of the prediction preparation process will be described with reference to FIG. 13. Note that, in the specific example of FIG. 13, the volume capacities are of six types, 1 TB, 2 TB, 3 TB, 4 TB, 5 TB, and 6 TB, for the sake of simplicity of descriptions.

For each volume capacity, $N_E$ is calculated in S1102, $N_R$ is calculated in S1104, and $N_{DIF}$ is calculated in S1105. In the example of FIG. 13, the number of volumes existing in the storage system 100 is 150, and the existence upper limit of the storage system 100 (sum of the existence upper limits of all storage nodes 250) is 250. Therefore, the number of volumes that can be created is 100 (=250−150). On the other hand, the insufficiency (sum of positive $N_{DIF}$) is 170 (=80+80+10). Therefore, all insufficient volumes cannot be created.

In order to maximize the number of volumes to be created for the insufficient volumes in such a case, the configuration change execution unit 112 deletes, in S1106, a number of invalid volumes, the number of which corresponds to the absolute value of $N_{DIF}$ at the maximum, for each volume capacity in which $N_{DIF}$ is negative. In the example of FIG. 13, for each volume capacity in which $N_{DIF}$ is negative, invalid volumes of the number corresponding to the absolute value of $N_{DIF}$ that is, 60 (=20 (for 1 TB)+20 (for 2 TB)+20 (for 6 TB)) volumes are deleted. Accordingly, the number of volumes existing in the storage system 100 is 90 (150−60). Therefore, 160 (=250−90) volumes can be newly created. In other words, the maximum number of volumes that can be created is 160.

Thereafter, in S1108, for each volume capacity in which $N_{DIF}$ is positive, the volume capacity with higher $N_{DIF}$ is more preferentially set as the target of volume creation. In the example of FIG. 13, first, 80 (=$N_{DIF}$) volumes of 5 TB are created. As a result, the maximum number of volumes that can be created is 80 (=160−80). Next, 80 (=$N_{DIF}$) volumes of 4 TB are created. As a result, the number of volumes that can be created is 0 (=80−80). Accordingly, although $N_{DIF}$=10 for 3 TB, any volume of 3 TB cannot be created. Therefore, when 80 volumes of 4 TB are created, "S1203: YES" in FIG. 12 is applied.

Figure 14:
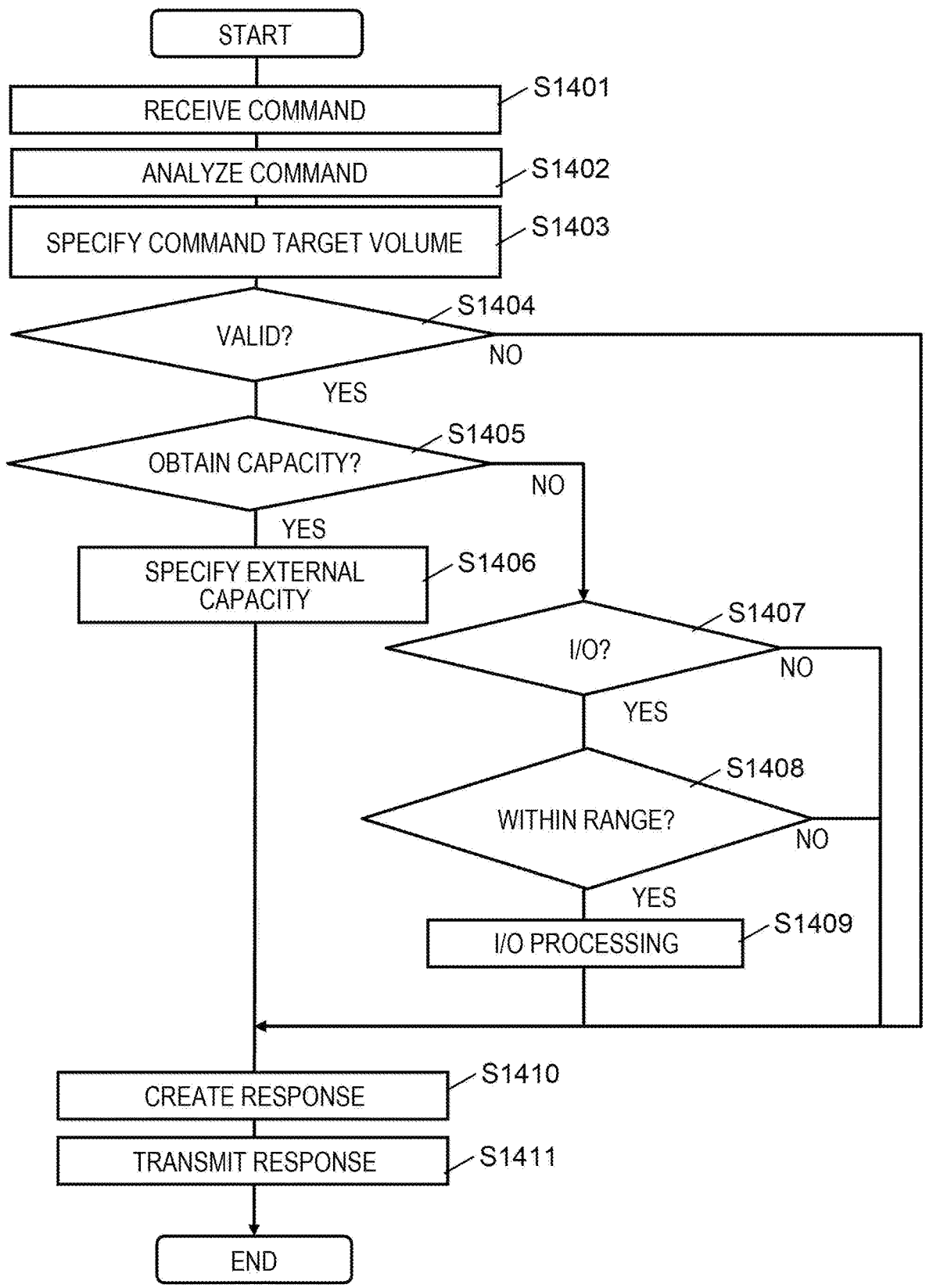
FIG. 14 is a flowchart of a command process.

FIG. 14 is a flowchart of a command process.

The command processing unit 502 receives a command from the compute node 150 (S1401), analyzes the command (S1402), and specifies a command target volume that is a volume corresponding to the volume ID specified by the command (S1403).

The command processing unit 502 determines whether the command target volume is a valid volume, specifically, whether the status flag 606 corresponding to the command target volume is "valid" (S1404). When a result of the determination in S1404 is false (S1404: NO), the command processing unit 502 creates a predetermined response (e.g., error) (S1410), and returns the response (S1411).

When the result of the determination in S1404 is true (S1404: YES), the command processing unit 502 determines whether the received command is a command for obtaining the volume capacity (S1405).

When a result of the determination in S1405 is true (S1405: YES), the command processing unit 502 specifies the external capacity 605 corresponding to the command target volume (S1406). The command processing unit 502 creates a response including information indicating the specified capacity (S1410), and returns the response (S1411).

When the result of the determination in S1405 is false (S1405: NO), the command processing unit 502 determines whether the received command is an I/O command (S1407). When a result of the determination in S1407 is false (S1407: NO), the command processing unit 502 creates the predetermined response (e.g., error) (S1410), and returns the response (S1411).

When the result of the determination in S1407 is true (S1407: YES), the command processing unit 502 determines whether an access range specified by the I/O command (e.g., topmost logical block address (LBA) and data length) is within a range corresponding to the external capacity of the command target volume (S1408). When a result of the determination in S1408 is false (S1408: NO), the command processing unit 502 creates the predetermined response (e.g., error) (S1410), and returns the response (S1411).

When the result of the determination in S1408 is true (S1408: YES), the command processing unit 502 performs I/O according to the I/O command (S1409), creates a response (e.g., completion) (S1410), and returns the response (S1411). Note that the "synchronous processing" in the present embodiment is processing of S1401 to S1411 excluding S1406.

Second Embodiment

A second embodiment will be described. In the descriptions thereof, differences from the first embodiment will be mainly described, and the descriptions of points common to the first embodiment will be omitted or simplified (this similarly applies to third and fourth embodiments to be described later).

In the second embodiment, in place of or in addition to volume configuration change performed in response to an operation request of the volume configuration change, a volume configuration change is performed according to a volume creation schedule indicated by a volume creation schedule table.

FIG. 15 is a diagram illustrating a configuration of the volume creation schedule table.

A volume creation schedule table 1500 is one of tables included in the management information 500 described above. One or more volume creation schedules indicated by the volume creation schedule table 1500 may include a schedule input by a user via a user interface such as a graphical user interface (GUI), or may include a schedule automatically created in accordance with a predetermined policy. The volume creation schedule table 1500 has, for example, an entry for each volume creation schedule. Each entry stores information such as a date and time 1501, volume capacity 1502, and the number of volumes 1503. Hereinafter, one volume creation schedule ("target schedule" in the descriptions of FIG. 15) will be exemplified.

The date and time 1501 indicates a date and time at which the volume of the volume capacity and the number of volumes according to the target schedule is created. The volume capacity 1502 indicates the volume capacity according to the target schedule. The number of volumes 1503 indicates the number of volumes according to the target schedule.

Figure 16:
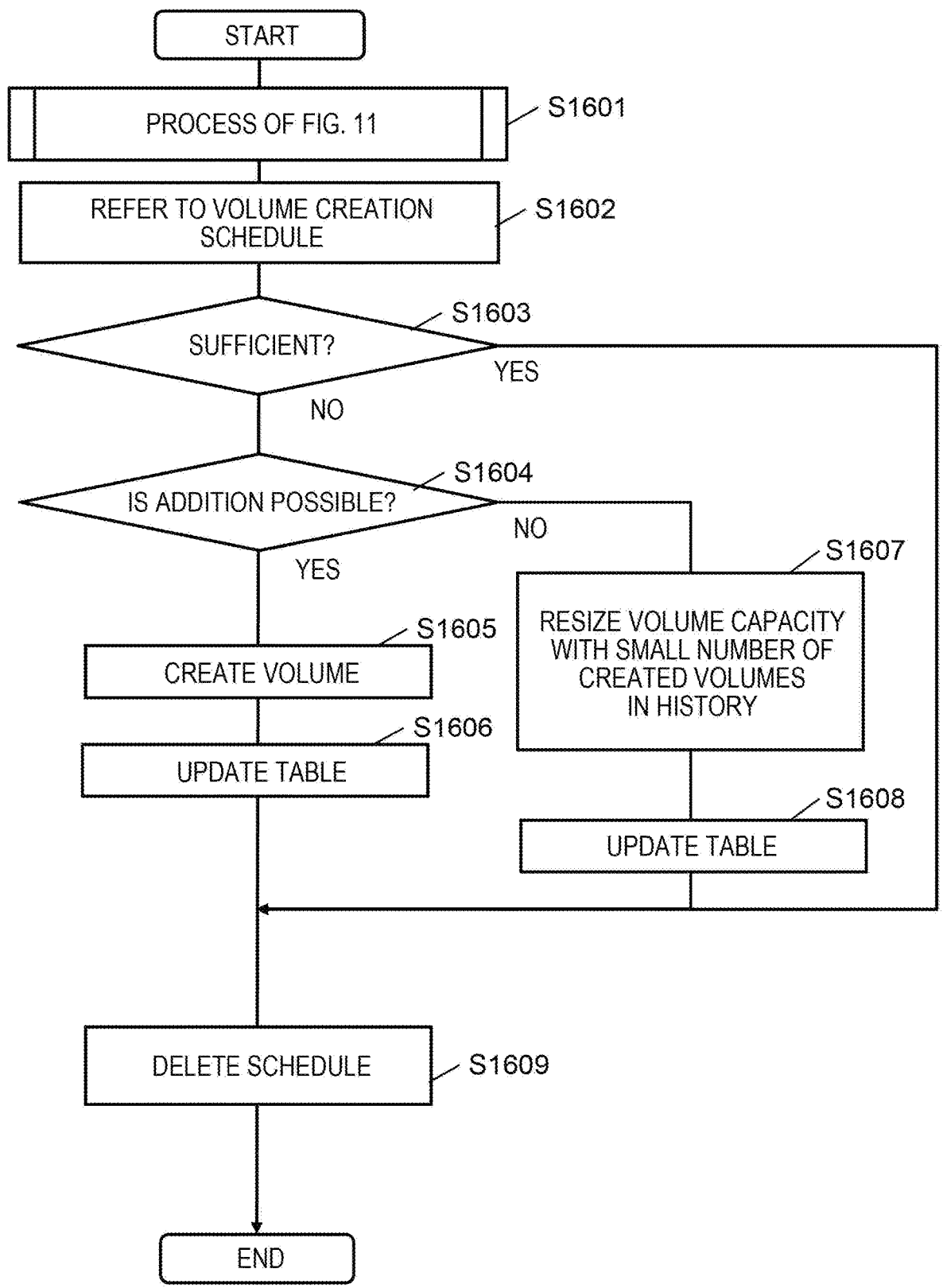
FIG. 16 is a flowchart of a prediction preparation process according to the second embodiment.

FIG. 16 is a flowchart of a prediction preparation process according to the second embodiment.

First, the prediction preparation process illustrated in FIG. 11 is performed (S1601). Note that a history indicated by an operation request history table 130 referred to in the prediction preparation process includes a history of volume creation according to the volume creation schedule. In the entry corresponding to the volume creation according to the volume creation schedule, a request source IP 701 may be a value indicating the volume creation schedule, and a reception date and time 706 may be a value same as the date and time 1501 corresponding to the volume creation schedule.

A configuration change execution unit 112 refers to the volume creation schedule table 1500 (S1602). The configuration change execution unit 112 may refer to the entire volume creation schedule table 1500, or may refer to entries belonging to a predetermined period (e.g., from a current time to a date and time a certain period of time ahead of the current time). Hereinafter, one or more volume creation schedules referred to in S1602 will be referred to as a "reference schedule group".

The configuration change execution unit 112 refers to a volume configuration table 140, and determines whether invalid volumes of the volume capacity and the number of volumes indicated by the reference schedule group exist (S1603). When even one invalid volume is insufficient, a result of the determination in S1603 is false. In the descriptions of FIG. 16, an insufficient invalid volume is referred to as an "insufficient volume".

When the result of the determination in S1603 is true (S1603: YES), the configuration change execution unit 112 deletes all entries corresponding to the reference schedule group from the volume creation schedule table 1500 (S1609).

When the result of the determination in S1603 is false (S1603: NO), the configuration change execution unit 112 determines whether the insufficient volume can be added (S1604). When the number of volumes existing in the storage system 100 has not reached the upper limit of existence of the storage system 100, a result of the determination in S1604 is true.

When the result of the determination in S1604 is true (S1604: YES), the configuration change execution unit 112 creates the insufficient volume (S1605), and updates the table (S1606). In S1606, an entry corresponding to the insufficient volume is added to the volume configuration table 140. In addition, in S1606, an entry corresponding to the volume creation may be added to the operation request history table 130. A status flag 606 corresponding to the insufficient volume is "invalid". Subsequent to S1606, the configuration change execution unit 112 performs S1609.

When the determination result in S1604 is false (S1604: NO), the configuration change execution unit 112 refers to the volume configuration table 140 and the operation request history table 130 to specify invalid volumes of the volume capacity in which the number of created volumes is relatively small (as small as possible) for the number of insufficient volumes, and changes the internal capacity of the specified invalid volume to the capacity of the insufficient volume (S1607). Accordingly, the possibility of existence of the invalid volumes of the volume capacity and the number of volumes indicated by the reference schedule group at the date and time indicated by the reference schedule group increases. Subsequent to S1607, the configuration change execution unit 112 updates at least the volume configuration table 140 (S1608), and performs S1609. In S1608, internal capacity 604 in the target entry (entry corresponding to the invalid volume in which the internal capacity is changed) in the volume configuration table 140 is updated. In addition, in S1608, an entry corresponding to the internal capacity change may be added to the operation request history table 130.

Third Embodiment

In a third embodiment, in addition to a front-end volume provided to a compute node 150 as a volume, there is a back-end volume constituting a pool that is a logical storage space as a source of a storage space allocated to the front-end volume. In the third embodiment, the front-end volume is a virtual volume conforming to the thin provisioning, and the back-end volume is a pool volume to be a constituent element of the pool. Operation requests for a volume configuration change include a virtual volume operation request such as creation, deletion, and a capacity change of a virtual volume, and a pool operation request such as addition of a volume to the pool, and deletion of a volume from the pool.

FIG. 17 is a diagram illustrating a configuration of a pool operation history table.

A pool operation history table 1700 is one of tables included in the management information 500 described above. Whereas an operation request history table 130 is an example of a first sub-history, the pool operation history table 1700 is an example of a second sub-history. The pool operation history table 1700 shows a history of a pool operation request. For example, the pool operation history table 1700 has an entry for each pool operation request. Each entry stores information such as a request source IP 1701, a request type 1702, pool ID 1703, volume ID 1704, volume capacity 1705, and a reception date and time 1706. Hereinafter, one pool operation request ("target operation request" in the descriptions of FIG. 17) will be exemplified.

The request source IP 1701 indicates an IP address of the compute node 150 as a transmission source of the target operation request. The request type 1702 indicates a type of pool operation (e.g., "pool expansion" and "pool shrink") specified by the target operation request. The pool ID 1703 indicates the ID of the pool having been subject to the pool operation specified by the target operation request. The volume ID 1704 indicates the ID of the volume that has been added or removed according to the pool operation specified by the target operation request. The volume capacity 1705 indicates the capacity of the volume that has been added or removed according to the pool operation specified by the target operation request. The reception date and time 706 indicates the date and time at which the target operation request has been received.

In the pool operation corresponding to the request type 1702 "pool shrink", the data stored in the volume excluded from the pool is moved to another volume existing in the pool, and mapping is changed. Mapping is a correspondence relationship between an area in a virtual volume and an area in a pool. When the mapping is changed, the movement destination area is allocated to the virtual area to which the movement source area has been allocated (area in the virtual volume) instead of the movement source area.

Figure 18:
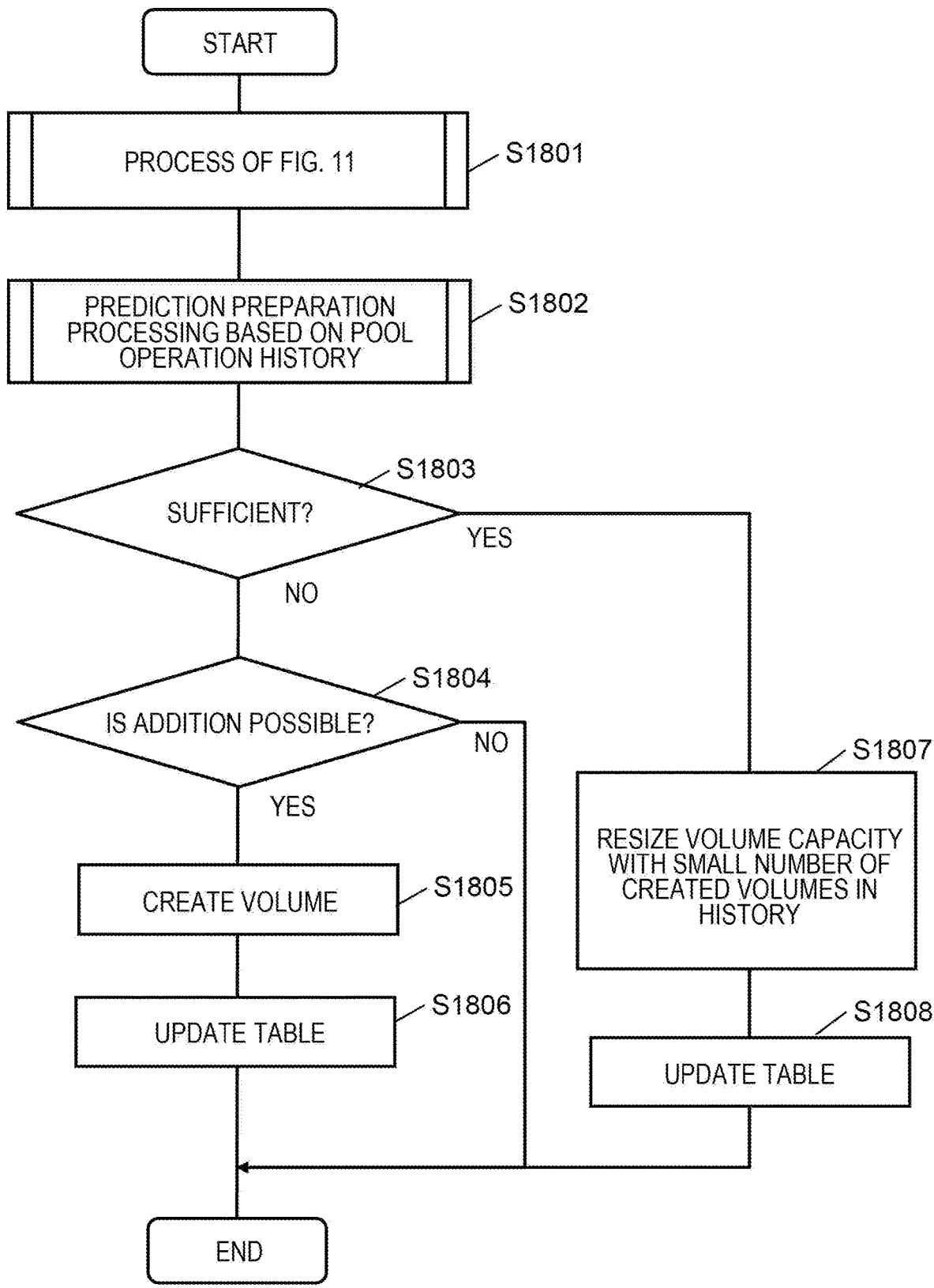
FIG. 18 is a flowchart of a prediction preparation process according to a third embodiment.

FIG. 18 is a flowchart of a prediction preparation process according to the third embodiment.

First, the prediction preparation process illustrated in FIG. 11 is performed (S1801).

Next, the prediction preparation process (FIG. 19) based on the pool operation history table 1700 is performed (S1802).

A configuration change execution unit 112 refers to a volume configuration table 140, and determines whether invalid volumes of the volume capacity and the number of volumes newly required for the pool exist (S1803). When even one invalid volume is insufficient, a result of the determination in S1803 is false. In the descriptions of FIG. 18, an insufficient invalid volume is referred to as an "insufficient volume". The insufficient volume is a volume to be added to the pool. Each of the number and the capacity of the insufficient volumes is a numerical value predicted (calculated) in the prediction preparation process (S1802) based on the pool operation history table 1700.

When the result of the determination in S1803 is false (S1803: NO), the configuration change execution unit 112 determines whether the insufficient volume can be added (S1804). When the number of volumes existing in a storage system 100 has not reached the upper limit of existence of the storage system 100, a result of the determination in S1804 is true. When the result of the determination in S1804 is false (S1804: NO), the process is terminated.

When the result of the determination in S1804 is true (S1804: YES), the configuration change execution unit 112 creates the insufficient volume (S1805), and updates the table (S1806). In S1806, an entry corresponding to the insufficient volume is added to the volume configuration table 140. In addition, in S1806, an entry corresponding to the volume creation is added to the operation request history table 130 and the pool operation history table 1700. A status flag 606 corresponding to the insufficient volume is "invalid".

When the determination result in S1803 is false (S1803: NO), the configuration change execution unit 112 refers to the volume configuration table 140 and the operation request history table 130 to specify invalid volumes of the volume capacity in which the number of created volumes is relatively small (as small as possible) for the number of insufficient volumes, and changes the internal capacity of the specified invalid volume to the capacity of the insufficient volume (S1807). Accordingly, the possibility of existence of the invalid volumes of the volume capacity and the number of volumes that may be newly required for the pool in future pool operation at the time of the future pool operation increases. Subsequent to S1807, the configuration change execution unit 112 updates at least the volume configuration table 140 (S1808). In S1808, internal capacity 604 in the target entry (entry corresponding to the invalid volume in which the internal capacity is changed) in the volume configuration table 140 is updated. In addition, in S1808, an entry corresponding to the internal capacity change may be added to the operation request history table 130.

Figure 19:
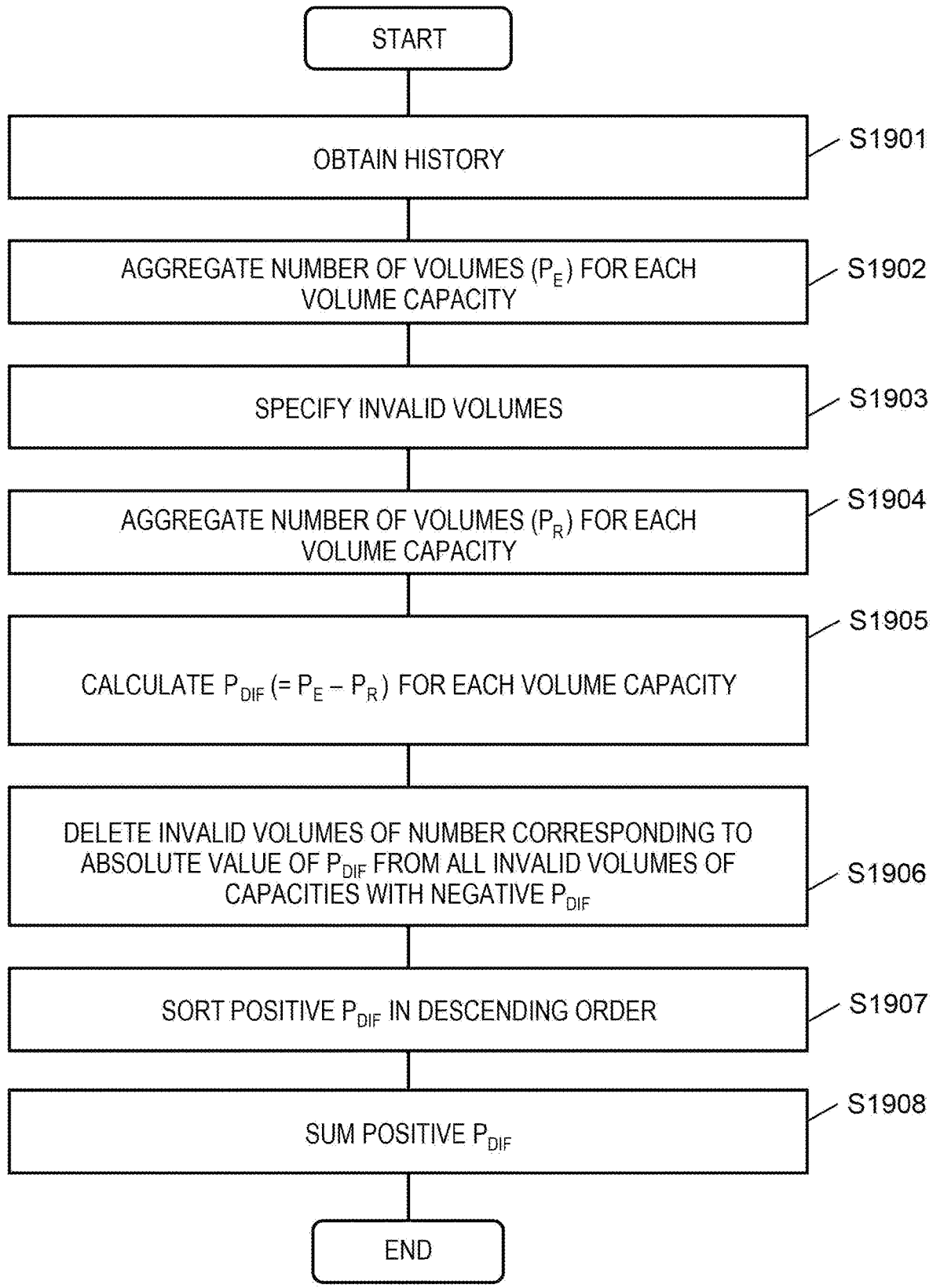
FIG. 19 is a flowchart of the prediction preparation process based on the pool operation history table.

FIG. 19 is a flowchart of the prediction preparation process based on the pool operation history table 1700.

A configuration change setting unit 111 obtains, from the pool operation history table 1700, a portion of the history (all entries) to which the reception date and time 1706 belongs during a certain period (e.g., period from the previous prediction preparation process in FIG. 19 to the current prediction preparation process in FIG. 19) (S1901). The configuration change setting unit 111 aggregates, for each volume capacity indicated by the obtained portion of the history, the number of volumes ($P_E$) on the basis of the obtained portion of the history (S1902). A set of the volume capacity and the number of volumes aggregated for the volume capacity (the number of volumes added to the pool) for each volume capacity is an example of a set of the volume capacity and the number of volumes predicted on the basis of the pool operation history table 1700. Note that the prediction of the set of the volume capacity and the number of volumes for the pool may be based on the output obtained by the portion of the history being set as an input of a predetermined learning model.

The configuration change execution unit 112 specifies invalid volumes from the volume configuration table 140 (S1903), and aggregates the number of invalid volumes ($P_R$) specified in S1903 for each volume capacity (specifically, for the internal capacity same as each volume capacity in S1902, etc.) (S1904). Note that the number of invalid volumes required in S1801 in FIG. 18 may be excluded from the number of volumes aggregated in S1904 for each volume capacity.

The configuration change execution unit 112 calculates $P_{DIF}=P_E-P_R$ for each volume capacity (S1905). $P_E$ is the number of volumes calculated in S1902. $P_R$ is the number of volumes calculated in S1904.

When there is volume capacity in which $P_{DIF}$ is negative, the configuration change execution unit 112 deletes a number of invalid volumes, the number of which corresponds to the absolute value of $P_{DIF}$ at the maximum, among all invalid volumes of the volume capacity (S1906).

The configuration change execution unit 112 sorts the positive $P_{DIF}$ in descending order (S1907). The configuration change execution unit 112 totals the positive $P_{DIF}$ (S1908). When the sum of this total and the number of volumes existing in the storage system 100 is less than the upper limit of existence of the storage system 100, the determination result in S1803 in FIG. 18 is true.

Fourth Embodiment

Figure 20:
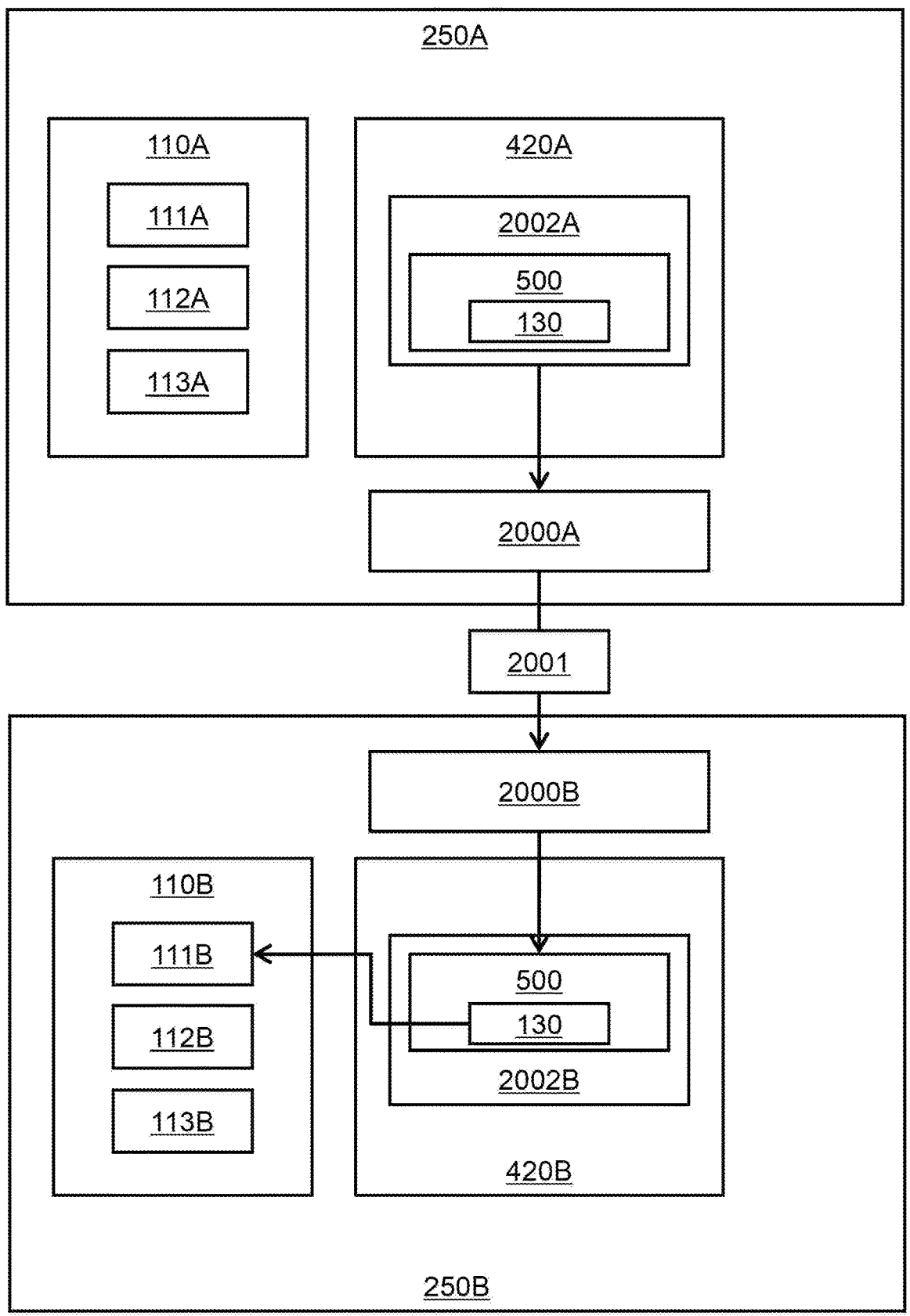
FIG. 20 is a schematic diagram illustrating an outline of a fourth embodiment.

FIG. 20 is a schematic diagram illustrating an outline of a fourth embodiment. In the following descriptions, common parts of reference signs may be used when elements of the same kind are described without being distinguished, whereas the reference signs may be used when the elements of the same kind are described while being distinguished. For example, a storage node may be denoted by "storage node 250" when it is described without being particularly distinguished, whereas it may be denoted by "storage node 250A" and "storage node 250B", for example, when respective storage nodes 250 are described while being distinguished from one another. In addition, in the following descriptions, x is added to the end of a reference sign of an element in a storage node 250x (x=A or B) to make it easy to understand which element is the element of which storage node 250.

Each storage node 250 includes a memory image I/O unit 2000 in addition to a configuration changing unit 110. The memory image I/O unit 2000 is one of the functions implemented by one or more programs being executed by a processor unit 430. The memory image I/O unit 2000 inputs and outputs a memory image. The "memory image" is an image of a memory unit.

The following process is performed in the present embodiment.

Management information 500 including an operation request history table 130 indicating a history of operation requests for a volume configuration change of a storage system 100 before a storage node 250B (exemplary second storage node) is added is stored in a memory unit 2002A of a storage node 250A (exemplary first storage node). A memory image I/O unit 2000A of the storage node 250A outputs a memory image 2001 including the management information 500 stored in the memory unit 2002A of the storage node 250A.

The output memory image 2001 is input to the storage node 250B by a memory image I/O unit 2000B of the storage node 250B added to the storage system 100 via a back-end network 202, for example. The memory image I/O unit 2000B loads the management information 500 in the memory image 2001 into a memory unit 2002B of the storage node 250B. Accordingly, even when there is no record of a volume configuration change, a history of the volume configuration change is stored in the storage node 250B. A configuration change setting unit 111B of the storage node 250B predicts volume capacity and the number of volumes on the basis of the operation request history table 130 included in the management information 500 loaded to the memory unit 2002B of the storage node 250B.

Although several embodiments have been described above, those are examples for describing the present invention, and the scope of the present invention is not limited to those embodiments. The present invention can be implemented in various other forms. For example, the descriptions above can be summarized as follows.

A storage system 100 having a processor unit 330 that provides a volume to be an object of an input/output (I/O) request and executes I/O in response to the I/O request includes a valid volume provided to be the object of the I/O request, and an invalid volume not being provided to be the object. A plurality of invalid volumes includes invalid volumes of a plurality of types of capacities. The processor unit 330 selects, when a volume creation request is received, the invalid volume on the basis of capacity according to the volume creation request to convert the selected invalid volume into a valid volume (e.g., B5 in FIG. 1), and provides the validated valid volume (e.g., B6 in FIG. 1).

The processor unit 330 may include a configuration change setting unit 111 that sets a combination of volume capacity and the number of volumes of the invalid volume, and a configuration change execution unit 112 that performs preparation processing of preparing a volume configuration according to the set combination of the volume capacity and the number of volumes (e.g., they may be implemented).

The configuration change execution unit 112 may calculate, for each volume capacity, a difference between the set number of invalid volumes and the current number of invalid volumes, and may determine a priority level of creation of the volume capacity on the basis of the difference to create the invalid volume. In the embodiments described above, a size of the positive $N_{DIF}$ corresponds to magnitude of the priority level of creation. The priority level of creation does not necessarily become higher as the positive $N_{DIF}$ increases. Note that the configuration change execution unit 112 may delete invalid volumes more than the set number mentioned above.

When the volume creation request is received, the processor unit 330 may select the invalid volume having capacity different from the capacity according to the volume creation request, convert the selected invalid volume into a valid volume, provide the valid volume, and change capacity of the valid volume to the capacity according to the volume creation request after the provision is started.

The preparation processing described above may be performed on the basis of a volume creation schedule that is a schedule indicating a date and time, volume capacity, and the number of volumes.

The configuration change setting unit 111 may set the combination of the volume capacity and the number of volumes of the invalid volume on the basis of a history of changes in configuration of the volume. Each compute node 250 (exemplary storage node) included in the storage system 100 may include a memory unit and the configuration change setting unit 111. The history may be shared by a plurality of compute nodes 250, and the configuration change setting unit 111 of each compute node 250 may set the combination of the volume capacity and the number of volumes of the invalid volume.

What is claimed is:

1. A storage system that provides a volume to be an object of an input/output (I/O) request and executes I/O in response to the I/O request, the storage system comprising:
  a processor;
  a valid volume provided to be the object of the I/O request; and
  an invalid volume not being provided to be the object of the I/O request,
  wherein invalid volumes of a plurality of types of capacities are included in a plurality of the invalid volumes,
  wherein the processor is configured to:
    select, when a volume creation request is received, a respective invalid volume based on respective capacities of the invalid volumes according to the volume creation request to convert the selected invalid volume into a valid volume, and provide the validated valid volume, set a combination, for each type of volume capacity, a number of volumes having the respective type of volume capacity based on a stored history of volume configuration changes and a current number of invalid volumes, calculate a difference between the number of volumes having the respective type of volume capacity and the current number of invalid volumes for each type of volume capacity of the types of capacities, and determine a priority level of creation of the volume of a respective type of volume capacity based on the difference to create the invalid volume.

2. The storage system according to claim 1, wherein the processor is configured to:

prepare a volume configuration according to the combination of the volume capacity and a number of volumes set.

3. The storage system according to claim 1, wherein the processor is configured to delete a number of invalid volumes that is equal to an absolute value of the difference upon determining the difference is a negative number.

4. The storage system according to claim 1, wherein when the volume creation request is received, the processor is configured to:

select the invalid volume having capacity different from the capacity according to the volume creation request;

convert the selected invalid volume into a valid volume to provide the valid volume; and change capacity of the valid volume to the capacity according to the volume creation request after the provision is started.

5. The storage system according to claim 2, wherein the processor is configured to perform a preparation processing on the basis of a volume creation schedule that is a schedule indicating a date and time, volume capacity, and the number of volumes.

6. The storage system according to claim 1, wherein each storage node included in the storage system includes a memory and processor and the history is shared by a plurality of storage nodes, wherein the processor is configured to set the combination of the volume capacity and the number of volumes of the invalid volume.

7. A method of controlling storage of a storage system that provides a volume to be an object of an input/output (I/O) request and executes I/O in response to the I/O request, the storage system including a valid volume provided to be the object of the I/O request and an invalid volume not being provided to be the object of the I/O request, and invalid volumes of a plurality of types of capacities are included in a plurality of the invalid volumes, the method comprising:

selecting, when a volume creation request is received, the invalid volume on the basis of capacity according to the volume creation request;

converting the selected invalid volume into a valid volume;

providing the validated valid volume;

setting a combination, for each type of volume capacity, a number of volumes having the respective type of volume capacity based on a stored history of volume configuration changes and a current number of invalid volumes;

calculating a difference between the number of volumes having the respective type of volume capacity and the current number of invalid volumes for each type of volume capacity of the types of volume capacities; and determining a priority level of creation of the volume of a respective type of volume capacity based on the difference to create the invalid volume.

8. A non-transitory recording medium storing a computer readable program causing a computer as a constituent element of a storage system that provides a volume to be an object of an input/output (I/O) request and executes I/O in response to the I/O request or a computer connected to the storage system to perform steps comprising:

selecting, when a volume creation request is received, the invalid volume on the basis of capacity according to the volume creation request;

converting the selected invalid volume into a valid volume;

providing, while the storage system includes a valid volume provided to be the object of the I/O request and an invalid volume not being provided to be the object of the I/O request, a plurality of the invalid volumes including invalid volumes of a plurality of types of capacities, the validated valid volume;

setting a combination, for each type of volume capacity, a number of volumes having the respective type of volume capacity based on a stored history of volume configuration changes and a current number of invalid volumes;

calculating a difference between the number of volumes having the respective type of volume capacity and the current number of invalid volumes for each type of volume capacity of the types of capacities; and determining a priority level of creation of the volume of a respective type of volume capacity based on the difference to create the invalid volume.

* * * * *